(12) United States Patent  
Vitsnudel et al.

(10) Patent No.: US 8,169,495 B2  
(45) Date of Patent: May 1, 2012

(54) METHOD AND APPARATUS FOR DYNAMIC PANORAMIC CAPTURING

(75) Inventors: Ilia Vitsnudel, Even Yeuda (IL); Ron Fridental, Herzeliya (IL)

(73) Assignee: Broadcom Corporation, Irvine, CA (US)

( * ) Notice: Subject to any disclaimer, the term of this patent is extended or adjusted under 35 U.S.C. 154(b) by 1005 days.

(21) Appl. No.: 11/945,689

(22) Filed: Nov. 27, 2007

(65) Prior Publication Data

US 2008/0129855 A1 Jun. 5, 2008

Related U.S. Application Data

(60) Provisional application No. 60/861,967, filed on Dec. 1, 2006.

(51) Int. Cl.
*H04N 5/235* (2006.01)
*H04N 7/18* (2006.01)

(52) U.S. Cl. ............ 348/222.1; 348/154; 348/169

(58) Field of Classification Search .......... 348/154–155, 348/169–172, 220.1, 208.1, 222.1
See application file for complete search history.

(56) References Cited

U.S. PATENT DOCUMENTS

| | | | | |
|---|---|---|---|---|
| 4,554,585 A | * | 11/1985 | Carlson | 348/342 |
| 5,796,095 A | * | 8/1998 | Matsuyama et al. | 250/208.1 |
| 6,937,282 B1 | * | 8/2005 | Some et al. | 348/335 |
| 7,009,645 B1 | * | 3/2006 | Sandini et al. | 348/275 |
| 7,227,573 B2 | * | 6/2007 | Stavely | 348/240.2 |
| 7,655,476 B2 | * | 2/2010 | Bui | 436/173 |
| 7,941,286 B2 | * | 5/2011 | Proksch et al. | 702/66 |
| 2001/0041073 A1 | | 11/2001 | Sorek et al. | |
| 2002/0141650 A1 | * | 10/2002 | Keeney et al. | 382/239 |
| 2006/0087565 A1 | * | 4/2006 | Okamoto et al. | 348/222.1 |
| 2006/0119722 A1 | * | 6/2006 | Mabuchi et al. | 348/308 |
| 2006/0132612 A1 | * | 6/2006 | Kawahara | 348/208.6 |
| 2006/0204055 A1 | * | 9/2006 | Steinberg et al. | 382/118 |
| 2006/0262345 A1 | * | 11/2006 | Le Leannec et al. | 358/1.15 |
| 2006/0284985 A1 | * | 12/2006 | Tokai | 348/211.99 |
| 2008/0122968 A1 | * | 5/2008 | Kikuchi et al. | 348/349 |
| 2009/0116747 A1 | * | 5/2009 | Duong et al. | 382/195 |
| 2010/0141682 A1 | * | 6/2010 | Perz et al. | 345/660 |

FOREIGN PATENT DOCUMENTS

WO 9847291 10/1998

OTHER PUBLICATIONS

Sovboda et al, "Central Panoramic Cameras: Design and Geometry," third Computer Vision Winter Workshop, Gozd Martuljek, Slovenia, Feb. 1998.

* cited by examiner

*Primary Examiner* — Hung Lam
(74) *Attorney, Agent, or Firm* — Brinks Hofer Gilson & Lione

(57) ABSTRACT

A method and apparatus for capturing an image depicting an area or region of interest. The method and apparatus use a large sensor, and a sampling function, which can be non-uniform, so that sensor cells depicting the region or object of interest are sampled more densely than other sensor cells, thus providing more details for the object or region of interest than to other areas, while still showing other areas for orientation and navigation purposes. The method and apparatus can be used for tracking the object or area of interest if either the area or object of interest, or the capturing device moves, by constantly adapting the densely sampled area on the sensor. The method and apparatus can be used for controlling the capturing device from a remote location.

31 Claims, 6 Drawing Sheets

METHOD AND APPARATUS FOR DYNAMIC PANORAMIC CAPTURING

RELATED APPLICATIONS

The present application claims priority from U.S. Provisional Patent Application No. 60/861,967 filed Dec. 1, 2006, the full content of which are incorporated herein by reference.

TECHNICAL FIELD

The present invention relates to the field of electronic imaging in general, and to an apparatus and method for dynamically imaging panoramic views, in particular.

BACKGROUND

A basic need in some image capturing applications is to track a predetermined object or area. Unlike audio tracking, in which the acquisition of a signal is performed omni-directionally, visual tracking may require changing the capturing direction or other parameters due to movement of the capturing device, the viewed object or area, or both. In such situations, there may exist a dilemma whether to capture only the object or area and a small surrounding region, or to capture a larger area. Capturing only a small surrounding enables relatively high resolution, and obtaining fine details about the target object or area. However, if the object of the capturing device moved, the object may disappear from the image, which will necessitate zooming out, locating the object and zooming back in. However, capturing the larger environment enables the viewer to keep the large picture and be able to track the moving object or area, but in much less detail, which may harm the tracking objective.

In still images acquisition, it is possible to use a large sensor, comprising many sensor cells, and to capture a large area in fine detail. However, in video imaging, wherein multiple images should be processed every second, processing the values obtained by a large number of sensor cells poses a problem. Thus in current video imaging systems, a choice should be made between a large area captured with low resolution, and smaller area captured with high resolution. A possible solution to this dilemma is to present two or more images, arranged in any required way, wherein one or more images show the area of interest in the required resolution, and one or more other images show areas neighboring to or including the area of interest, in preferably lower resolutions. However, this solution does not provide easy navigation and orientation of a user, since the user has to integrate in his or her mind the information from multiple images.

Yet another solution is presenting a panoramic image over a widescreen display. Such presentation does not necessarily provide more details to a required area, is specifically limited to wide captured scenes, and distorts the whole image, thus limiting orientation.

Thus there is a need in the art for a method and apparatus for enabling capturing of relatively large areas while providing high resolution for a particular area of the captured scene. The method and apparatus should be appropriate for video capturing, and enable tracking of objects or areas which are moving relatively to the capturing device.

SUMMARY

A method and apparatus for capturing a panoramic image, detailing a region or object of interest in higher resolution than the surrounding environment.

In accordance with a preferred embodiment, there is thus provided a method for acquiring an image by a capturing device, the capturing device comprising a sensor, the image depicting an object or a region of interest, the method comprising the steps of: capturing the image by the sensor, the sensor comprising a multiplicity of sensor cells; obtaining one or more sampling functions; and obtaining values by sampling a sub-group of the multiplicity of sensor cells, the sub-group determined according to one of the sampling functions. Within the method, one or more of the sampling functions can be non-uniform. The sampling functions optionally indicate denser sampling of sensor cells depicting the object or region of interest than other sensor cells. Within the method, each of the sampling functions can comprise a horizontal sampling function and a vertical sampling function. The method optionally comprises a step of transferring the values. The method optionally comprises a step of receiving a control command. The control command is optionally received from a remote controlling unit. Within the method the sampling function optionally changes due a movement of the region or object of interest or a movement of the capturing device. Optionally, the region or object of interest is identified by an item selected from the group consisting of: face recognition; image processing; and a user pointing at an area of a displayed image. The sampling function is optionally determined according to a location of one or more sensor cells depicting the region or object of interest. Within the method, the region or object of interest is optionally identified by an item selected from the group consisting of: face recognition; image processing; and a user pointing at an area of a displayed image. The sampling function is optionally hard coded. Within the method, the sampling function is optionally further adjusted using software. The sampling function is optionally received from a remote controlling unit, or the sampling function is determined by execution of mathematical or logical operations. The method is optionally used for tracking the object or region of interest. Within the method, values of cells not belonging to the sub-group of the multiplicity of sensor cells are optionally added to values of cells belonging to the sub-group a sub-group of the multiplicity of sensor cells.

Another aspect of the disclosure relates to an apparatus for acquiring an image, the apparatus comprising: a sensor, the sensor comprising a multiplicity of sensor cells; a sampling unit for obtaining values by sampling a sub-group of the multiplicity of sensor cells, the sub-group determined according to a sampling function. The apparatus can further comprise a processing unit for determining the sampling function. The apparatus optionally comprises a communication unit for receiving the sampling function, or a communication unit for receiving a parameter related to the sampling function and a processing unit for determining the sampling function. The apparatus can further comprise a storage unit for storing the sampling function or a control unit for controlling how the sensor captures the image. The control unit is optionally remote. The apparatus optionally comprises display device. Within the apparatus, the sampling function is optionally non-uniform. in the apparatus, the sampling function optionally indicates denser sampling of sensor cells depicting the object or region of interest than other sensor cells. The sampling function optionally comprises a horizontal sampling function and a vertical sampling function.

BRIEF DESCRIPTION OF THE DRAWINGS

Non-limiting embodiments of the invention will be described with reference to the following description of exemplary embodiments, in conjunction with the figures. The figures are generally not shown to scale and any sizes are only meant to be exemplary and not necessarily limiting. In the figures, identical structures, elements or parts that appear in more than one figure are preferably labeled with the same or similar number in all the figures in which they appear, in which.

DETAILED DESCRIPTION

Digital imaging generally uses an array of sensors, preferably arranged in a matrix-like structure comprising rows and columns. All sensors may be sensitive to one color, or each sensor may be sensitive to one of a predetermined number of colors, for example red, blue, green or a subset thereof. When multiple sensor types are available, the sensors are preferably arranged in a predetermined manner, such as rows made up of sensor quadruples arranged as a 2×2 matrix.

The disclosure relates to a method and apparatus for viewing a relatively large view area, so that tracking an object moving relatively to the capturing device is possible, while supplying higher resolution for a smaller area or region of interest (ROI) or object of interest. The method and apparatus are dynamic and efficient, thus enabling real-time tracking of a particular ROI using a video capturing device. The method and apparatus relate to non-uniform sampling of sensor cells of a video sensor. An indication to the location within the sensor of the image of the ROI is obtained. Then, sensors cells closer to the image of the ROI are sampled with high density, while farther sensor cells are sampled more dispersedly. Thus, the large picture is preserved therefore enabling tracking the ROI, while high resolution which supplies fine details is provided for the ROI. The sampling density is indicated by any sampling function or other structure that provides for any distance between a pixel and the pixels depicting the ROI the required sampling density. Using the method and apparatus, a sensor comprising a large number of cells, such as used in still imaging can be used in video capturing devices. Selectively sampling such sensor enables real-time processing and transmission of the images, as required in video capturing. The sampling function can be determined and changed dynamically according to the movement or location of an area or object of interest relatively to the capturing device. The area or object of interest can be tracked using image processing techniques, such as face detection techniques, marker following, by a user pointing at a screen using a mouse, a touch screen or another pointing device or other tracking techniques. When tracking is required, the ROI (i.e. the region with high resolution sampling) is optionally constantly adapted according to the motion of the object being tracked or the motion of the capturing device. The ROI can be adapted every image, every predetermined number of images, every predetermined period of time or the like. For example, when shooting a film, the director can focus on the scene rather than pay attention in order to make sure the camera follows the correct region.

Figure 1:
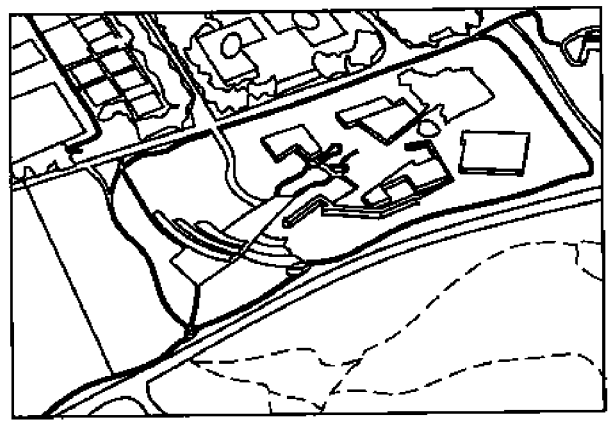
FIG. 1 shows a way of presenting two images showing an area of interest.
Figure 1:
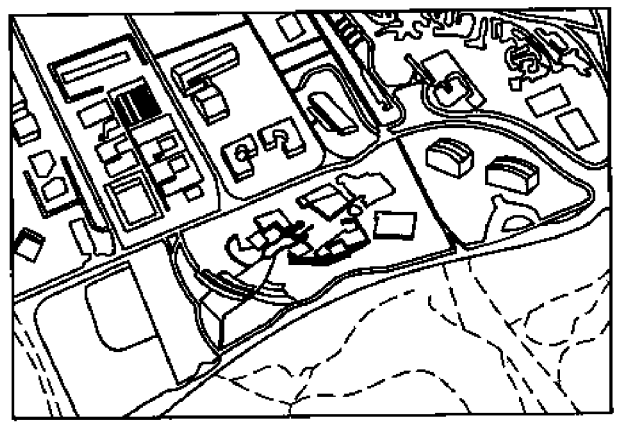

Referring now to FIG. 1, showing two images for demonstrating the problem in tracking an object. The lower part of FIG. 1 shows a wide area, in which a particular ROI is to be tracked. The upper part shows only the ROI in more details. Thus, if the bottom part of FIG. 1 is shown, details for the ROI are missing, while if the upper part is shown, a person or a system tracking the ROI may lose the context. Further, if the tracked object is a car which moves from the ROI outward, it may be lost if only the detailed picture is presented.

Figure 2:
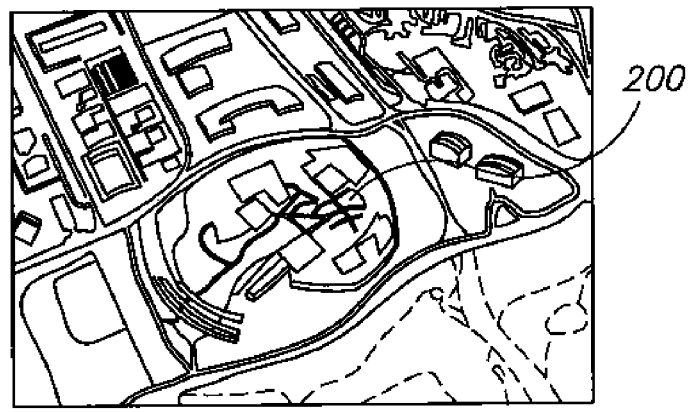
FIG. 2 shows a fisheye image, generated in accordance with a preferred implementation of the disclosure.

Referring now to FIG. 2, showing an image captured using the disclosed method and apparatus. The image can be described as a "fisheye" image, wherein one or more areas are captured in more details than other areas. Within the image, the ROI generally referenced 200 is shown with resolution relatively high to the rest of the image. The larger the distance of an area of the sensor from the pixels depicting the ROI, the less densely the pixels depicting the area are sampled. The density is preferably a gradual function of the distance between the relevant pixels and the pixels depicting the ROI, so that there is no cut-off point between the high resolution ROI and the low-resolution farther environment, so that an object leaving the ROI can still be viewed with sufficient details to track it and adjust the next images. As the ROI moves, either due to a movement of an object to be tracked or due to a movement of the capturing image, the object or area is tracked within consecutive images, the pixels depicting their immediate area are sampled with high density and other areas are sampled with lower density, according to the distance between the areas and the pixels depicting the ROI.

Figure 3:
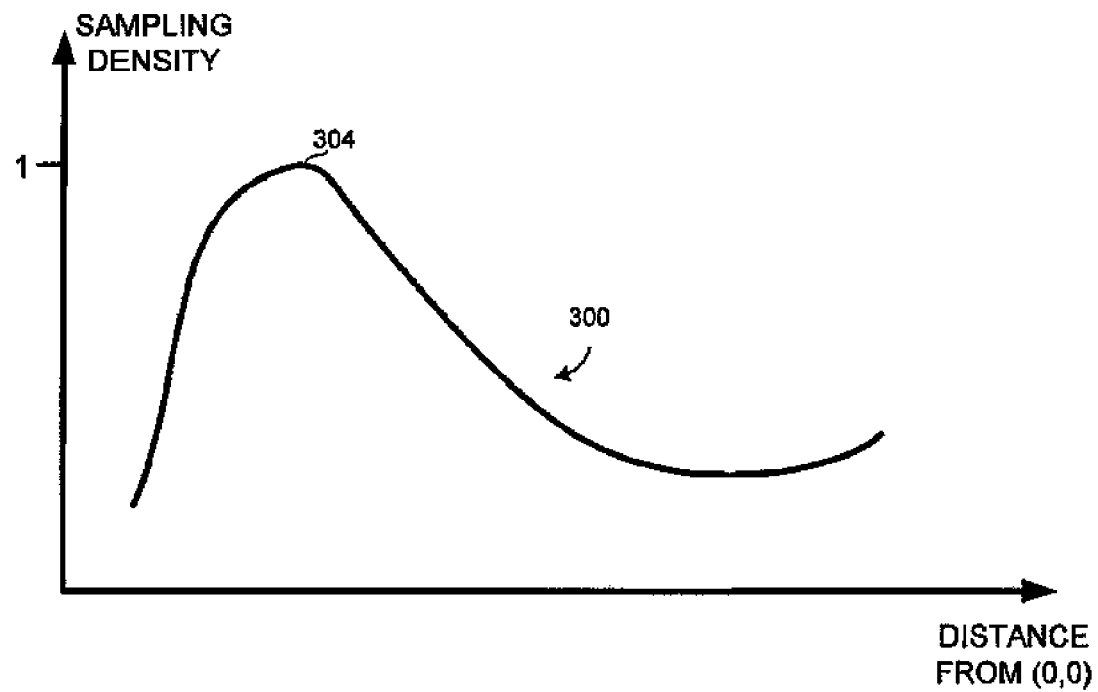
FIG. 3 is a schematic illustration of an exemplary graph showing the sampling function, in accordance with the disclosure.

Referring now to FIG. 3, showing an exemplary graph of the sampling density for a particular image. Graph 300 shows a non-uniform sampling density with which a sensor is to be sampled. The density in graph 300 is a function of the distance between the particular area and the top-left corner of the sensor. In graph 300, the highest value, reached at point 304 is optionally obtained at the center of the ROI, in which the sampling density can be as high as 1, i.e. all sensor values are read and transferred. In such situations, the graph may be changed as different pixels depict the ROI. Alternatively, the graph can be independent of the location of the pixels depicting the ROI, so that the same parts of the sensor are sampled in the same destiny regardless of the image. It will be appreciated by a person skilled in the art, that the graph can be replaced with two graphs, one for horizontal sampling density as a function of the distance from the top side of the sensor, and the other for vertical sampling density as a function of the distance from the left side of the sensor. The graph may be determined using the total number of sensor cells that should be transferred in order to supply a predetermined transfer rate, according to the location of pixels depicting the ROI, received from an external source or otherwise obtained.

Figure 4:
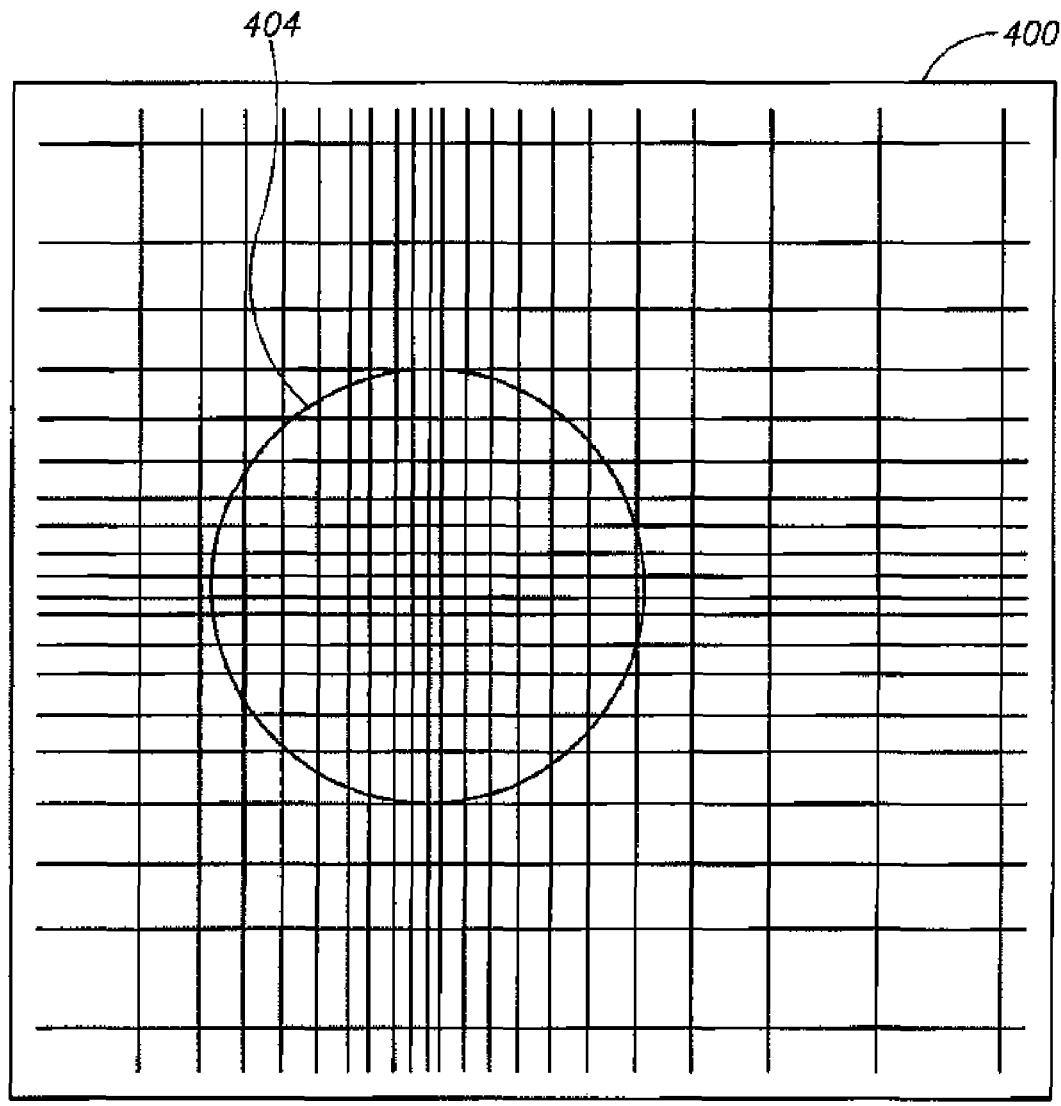
FIG. 4 is a schematic illustration of sampling a sensor, in accordance with the disclosure.

Referring now to FIG. 4, showing a schematic illustration of the variable sampling of a sensor 400, in accordance with the disclosure. In FIG. 4, the sampled sensor cells are those located on or closest to the crossing of a horizontal line and a vertical line. Around area 404, which can include the same sensor cells in all images, or change according to the depiction of the ROI on sensor 400, the density of the sampled sensor cells is higher than in other areas of sensor 400. The density decreases as the distance from area 400 increases. The sampling density values and the way they change can differ along the horizontal and vertical directions. It will be appreciated that the disclosure is not limited to a single dense area within an image, and that multiple dense areas like area 404 can be shown within a single image, wherein the rest of the image is sampled at lower densities. The actual sampling is optionally performed as follows: if, for example, only a fourth of the pixels are to be sampled, then only every fourth pixel or every fourth line are sampled. Then, in practical implementation three pulses are issued which only move pixels or lines horizontally or vertically but the value of these pixels are not read. The only pixels whose values are used are the fourth pixels or lines. In yet another preferred embodiment, the final value might be the sum of the values of the four pixels, thus amplifying the signal, improving the sensitivity and smoothing the final image.

Figures 5A, 5B, 5C:
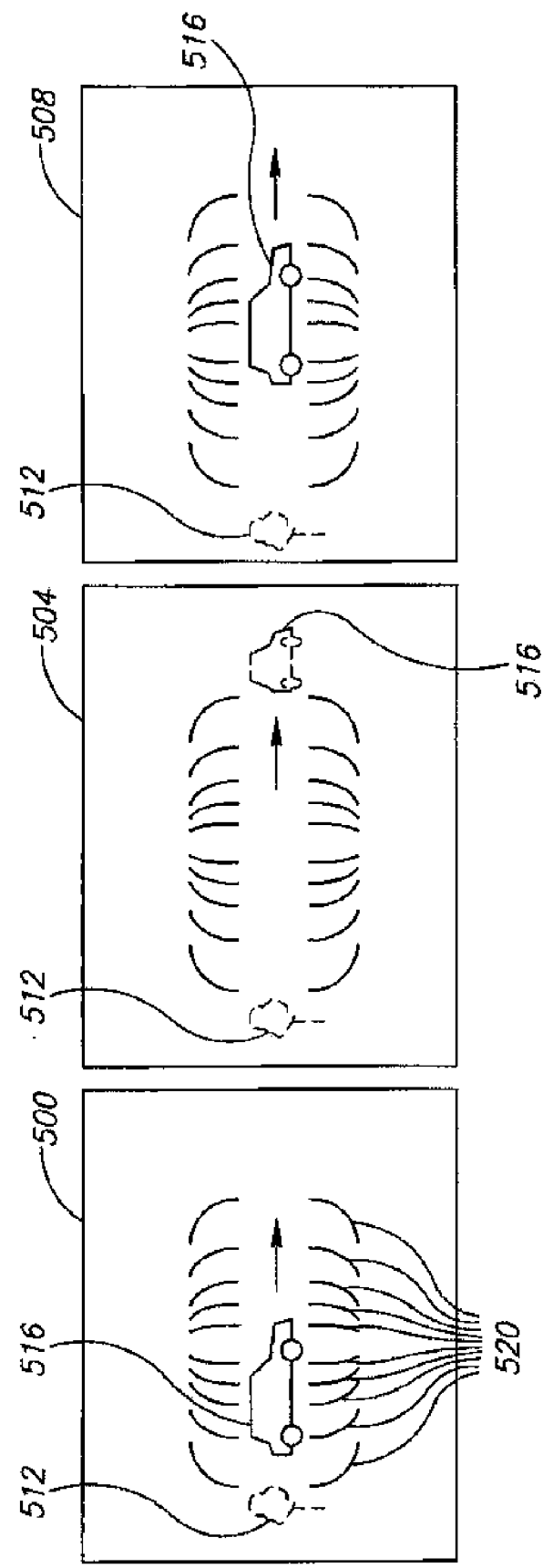
FIGS. 5A, 5B and 5C show a usage scenario of tracking an object in multiple images, in accordance with the disclosure.

Referring now to FIGS. 5A, 5B and 5C, showing a usage scenario of the disclosed method and apparatus for tracking an object within a scene. FIGS. 5A, 5B and 5C are frames of a video stream wherein FIG. 5A shows image 500 of a scene, FIG. 5B shows image 504 of the same scene after a period of time has elapsed, and FIG. 5C shows the same image as FIG. 5B after being processed according to the current disclosure. The objective in FIGS. 5A, 5B and 5C is to follow car 516 which is moving to the right. On FIG. 5A, car 516 is close to the center of the frame, and tree 512 is helpful for a person watching the video stream to get the overall picture. Thus, as indicated by lines 520, the central area of the image is captured in greater detail than the sides. Then, on FIG. 5B, car 516 is moving rightward, and is about to exit the screen. Then, if the next images will capture the car, tree 512 will not be captured, and the viewer might lose his or her orientation. Therefore, the sampling function of the sensor capturing the image is changed, and is made finer around the sensor cells capturing car 516 and coarser on the sides, thus still showing car 516 in detail, as well as tree 512 in less detail, but still visible and useful for orientation. Thus, FIG. 5C shows a larger area than FIG. 5A. Therefore, if the same number of pixels is to be sampled in 5A and 5C, and the same level of detail is required for the car then the sampling towards the edges should be coarser in 5C then in 5A. Thus, through applying a sampling function, the captured area can be changed, as well as the level of detail in various parts of the image.

Figure 6:
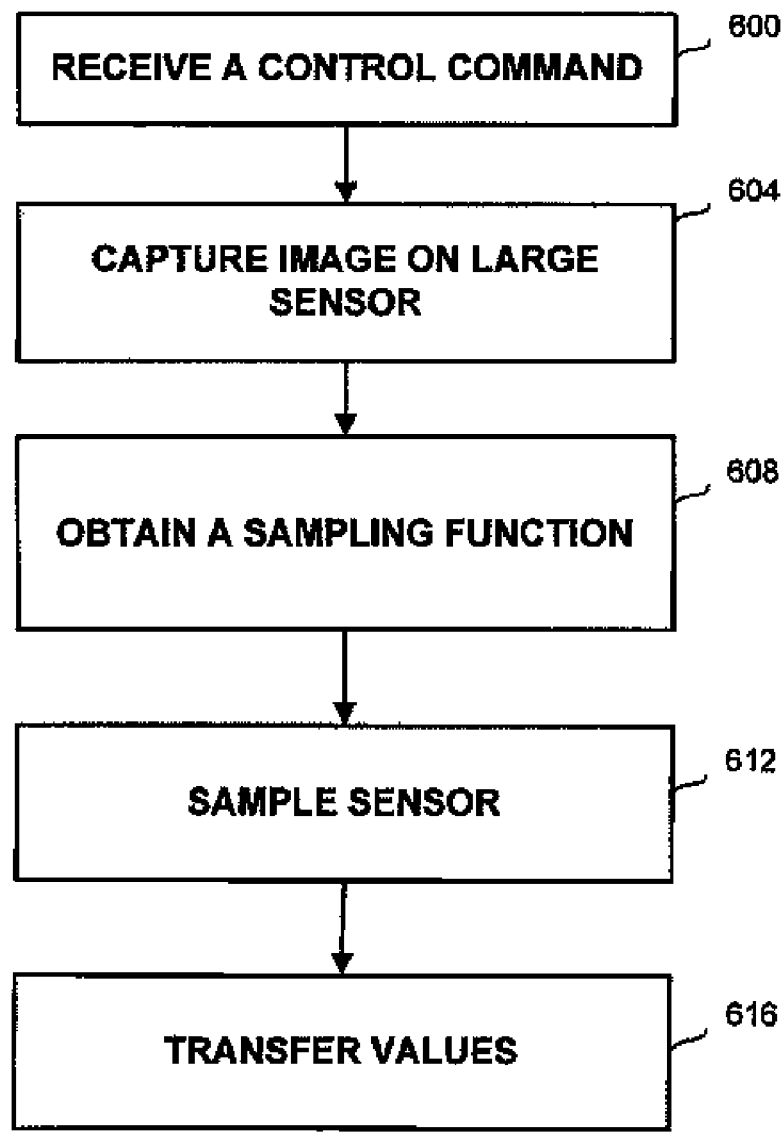
FIG. 6 is a flowchart showing the main steps in a method for tracking an object in accordance with the disclosure.

Referring now to FIG. 6, showing a flowchart of the main steps in a method for capturing a panoramic image in accordance with the disclosure. On step 600 a control command is received by a capturing device having a large sensor, for example a video capturing device having a sensor comprising multiple sensor cells. The control command can be received physically for example by a human operator physically moving the device to capture an image in a different direction, zooming in or out, or the like. Alternatively, the control commands can be received electronically, for example via a communication channel by a remote control unit or mechanism which controls the capturing direction, the zoom level or other parameters. On step 604, an image is captured by the large sensor of the capturing device, according to the control command, i.e. in the direction and zoom as indicated by the control command. Optionally, if no control command was received, the capturing device can keep capturing according to the last indicated parameters. On step 608, a sampling function is obtained. The function can be received from an external source, for example through the same communication channel transferring the control commands. Alternatively, the sampling function can be determined by a processing unit associated with the capturing device according to one or more parameters such as a location of an object to be captured. In yet another alternative, a default sampling function can be used. The sampling function can be presented in any possible manner, including a mathematical or logical function, a look up table, or the like. The sampling function can be separate or combined for the horizontal and vertical axes. If the function is separate for the horizontal and vertical axes, it can be identical or different for the axes. The function can be but is not required to be symmetrical in one or more axis, and can comprise one or more densely sampled areas, one or more coarsely sampled areas, and optionally one or more transitional areas.

On step 612 a sub-set of the sensor cells is sampled, and values are obtained. The sampled sensor cells are determined according to the sampling function. Preferably, the function indicates which sensor cells are to be sampled. Alternatively, for each sensor, a combination of the sensor value itself or two or more neighboring sensor values can be integrated into a single value. If the function does not provide a specific sensor cell, for example if a non-integer cell indicator is obtained, the indication is preferably rounded to the nearest cell.

On step 616 the sampled values are preferably transferred, either to a display device, to a storage device, to a remote unit or the like.

The method repeats for each image. However, step 600 can be omitted, in which the control command preferably remains as previously received. Step 608 can also be omitted. For example, step 608 can be performed only every predetermined period of time, or every predetermined number of images. If no function is obtained, a default function, for example a uniform sampling function or any other function can be obtained. Alternatively a previously obtained function can be used.

Figure 7:
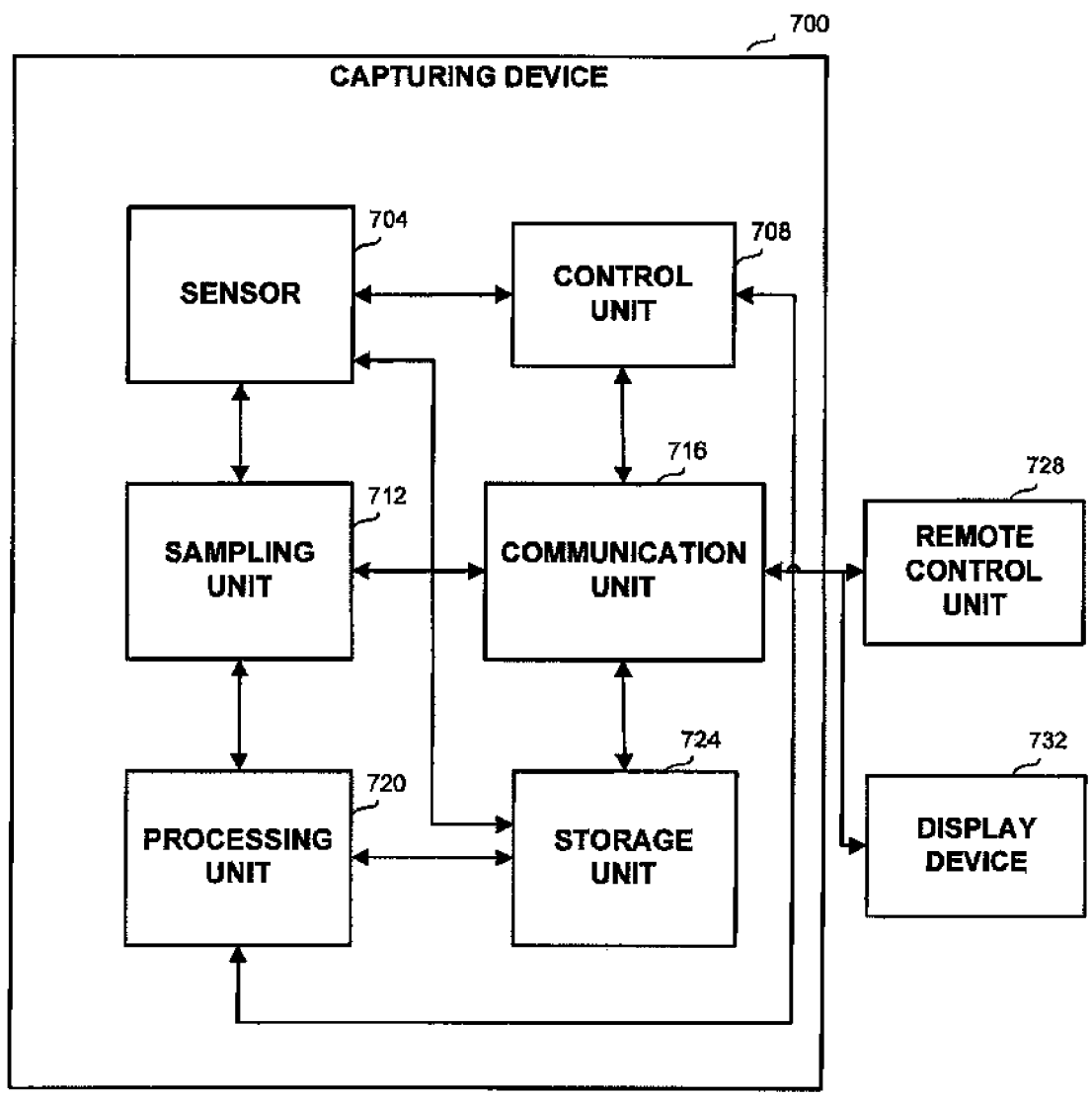
FIG. 7 is a block diagram showing the main components in an apparatus for tracking an object in accordance with the disclosure.

Referring now to FIG. 7, showing a block diagram of the main components in an apparatus for capturing a panoramic image of an object or an area in accordance with the disclosure. The apparatus comprises sensor 704, preferably a large sensor that comprises a large number of sensor cells. The sensor can be of any type, including a CMOS sensor or a CCD sensor, or any type of sensor currently known or that will become known in the future. The sensor is preferably a large sensor, for example a 12 Mega pixel, arranged as a 4096× 3072 pixels matrix. Sensor 700 is optionally controlled by control unit 708, which can control the direction in which the sensor moves, and electronic or optical components affecting the image received by the sensor and the like. The apparatus comprises a processing unit 720, an optional communication unit 716, sampling unit 712 and storage unit 724. Processing unit 720 is preferably a computing platform provisioned with a memory device (not shown), a CPU or microprocessor device, and several I/O ports (not shown), for executing computer instructions. Alternatively, processing unit 720 can be implemented as firmware ported for a specific processor such as digital signal processor (DSP) or microcontrollers, or can be implemented as hardware or configurable hardware such as field programmable gate array (FPGA) or application specific integrated circuit (ASIC). Storage unit 724 is preferably a storage device, for example a magnetic storage device such as a hard disk; an optical storage device such as a CD, a DVD, or a laser disk; a semiconductor storage device such as Flash device, memory stick, or the like. Sampling unit 712 samples the values of a sub group of the sensor cells of sensor 704. Sampling unit 712 samples only those sensor cells according to a sampling function received from remote control unit 728 through communication unit 716, determined by processing unit 720 through the execution of mathematical or logical operations, or determined by processing unit 720 using data received from communication unit 716. The sampling function can also be hard-coded and optionally adjusted by software according to the conditions at capturing time. The sampling function and additional data, such as various default sampling functions or computer instructions for determining the sampling function are optionally stored in storage unit 724. A remote control unit 728 connected through any wired or wireless communication channel to capturing device 700 can issue control commands to capturing device 700. The resulting images can be transferred by communication unit 716 to any display device 732.

The disclosed method and apparatus enable the capturing of a panoramic image, such that a ROI is presented with higher resolution, while still maintaining additional areas of the image, for purposes such as orientation and navigation. The method and apparatus enable the usage of large sensor, without requiring long transfer time of data. The sensor is sampled according to an optionally non-uniform sampling function, which samples the sensor more densely in and around the sensor cells depicting the ROI or the object of interest, and more coarsely in other areas. The sampling function can be determined or changed according to the movement of an object identified within the captured images, according to a movement of the capturing device, arbitrarily, or in any other method.

The disclosed method and apparatus can be used to control an imaging device from remote. A remote controller determines the sampling function, or a parameter related to the sampling function, such as the location of an object to be tracked. The remote controller sends via a communication channel control commands. The control commands are determined by a user viewing the captured images, by a computer program or computerized system tracking an object, by a predetermined route or the like. Optionally, the sampling function is determined by the controlling unit and also transferred to the capturing device. If a sampling function was not transferred to the capturing device, the capturing device determines the sampling function. The capturing device captures an image, activates the sampling function on the image and transmits the sampled values. The sampling function or the control commands can be determined and transferred before capturing every image, after every predetermined number of images, only when a change from previous commands exceeds a predetermined threshold, or the like. The sampling function or the control commands can change according to the location or movement of the region or object of interest relatively to the capturing device. The region or object of interest can be determined using face recognition techniques or other image processing techniques, by a user pointing at a display showing captured images by a mouse, a touch screen, a joy stick or the like, or using any other way for identifying the region or object of interest, It will be appreciated by a person skilled in the art that the disclosed method and apparatus can be used with any optical mechanism, such as a focusing lens and panoramic mirror that widens the scope of the image captured by the sensor. It will be further appreciated that the disclosure can be used with any other method or equipment designed for other purposes, such as enhancing the illumination range within an image, Structure and acts described herein are replaceable by equivalents, which perform the same function, even if the structure or acts are different, as known in the art. Therefore, only the elements and limitations as used in the claims limit the scope of the invention. When used in the following claims, the terms "comprise", "include", "have" and their conjugates mean "including but not limited to".

The invention claimed is:

1. A method for acquiring at least one image by a capturing device, the capturing device comprising a sensor, the at least one image depicting an object or a region of interest, the method comprising:
   capturing the at least one image by the sensor, the sensor comprising a multiplicity of sensor cells that are arranged in a matrix;
   obtaining at least one sampling function; and
   obtaining values by sampling a sub-group of the multiplicity of sensor cells, the sub-group being determined according to the at least one sampling function, wherein a higher resolution is achieved nearer the object or inside the region of interest by sampling a higher density of the sensor cells near the object or inside the region of interest and sampling a lower density of the sensor cells that are not near the object or inside the region of interest.

2. The method of claim 1 wherein the sampling function is non-uniform that can be determined and changed dynamically according to the movement of the object or the region of interest relative to the capturing device.

3. The method of claim 1 wherein the resolution gradually decreases as the distance increases away from the object or the region of interest.

4. The method of claim 1 wherein the sampling function comprises a horizontal sampling function and a vertical sampling function.

5. The method of claim 1 further comprising transferring the values.

6. The method of claim 1 further comprising receiving a control command.

7. The method of claim 6 wherein a highest resolution is achieved when all available sensor cells in the region of interest are selectively sampled and wherein a lower resolution is achieved when a subset of the available sensor cells in the region of interest are selectively sampled.

8. The method of claim 1 wherein the sampling function changes due a movement of the region or object of interest.

9. The method of claim 8 wherein the region or object of interest is identified by one or more of the following: face recognition; image processing; and a user pointing at an area of a displayed image.

10. The method of claim 1 wherein the sampling function is determined according to a location of one or more sensor cells depicting the region or object of interest.

11. The method of claim 1 wherein the sampling function changes due to a movement of the capturing device.

12. The method of claim 11 wherein the region or object of interest is identified by one or more of the following: face recognition; image processing; and a user pointing at an area of a displayed image.

13. The method of claim 1 wherein the sampling function is hard coded.

14. The method of claim 13 wherein a highest resolution is achieved when all available sensor cells in the region of interest are selectively sampled and wherein a lower resolution is achieved when a subset of the available sensor cells in the region of interest are selectively sampled.

15. The method of claim 1 wherein the sampling function is received from a remote controlling unit.

16. The method of claim 1 wherein the sampling function is determined by execution of mathematical or logical operations.

17. The method of claim 1 when used for tracking the object or region of interest.

18. The method of claim 1 wherein values of cells not belonging to the sub-group of the multiplicity of sensor cells are added to values of cells belonging to the sub-group a sub-group of the multiplicity of sensor cells.

19. An apparatus for acquiring at least one image, the apparatus comprising:
- a sensor that comprises a multiplicity of sensor cells that are arranged in a matrix; and
- a sampler that obtains values by sampling a sub-group of the multiplicity of sensor cells, the sub-group being determined according to at least one sampling function, wherein a higher resolution is achieved nearer an object or inside a region of interest depicted in an image by sampling a higher density of the sensor cells near the object or inside the region of interest and sampling a lower density of the sensor cells that are not near the object or inside the region of interest.

20. The apparatus of claim 19 further comprising a processor that determines the at least one sampling function, wherein the at least one sampling function gradually decreases resolution as the distance increases away from the object or the region of interest.

21. The apparatus of claim 19 wherein the object or the region of interest is tracked using a user interface.

22. The apparatus of claim 19 further comprising a communicator that receives a parameter related to the at least one sampling function and a processor that determines the at least one sampling function.

23. A video capturing device, comprising:
- a plurality of sensor cells;
- a processor operatively coupled to a memory and to the plurality of sensor cells,
- wherein one or more of the plurality of sensors, the processor and the memory are configured to selectively sample some, but not all of the sensor cells, to enable real-time processing of images, wherein a higher resolution is achieved nearer an object or inside a region of interest depicted in one or more images by sampling a higher density of the sensor cells near the object or inside the region of interest and sampling a lower density of the sensor cells that are not near the object or inside the region of interest.

24. The apparatus of claim 19 further comprising a controller that controls how the sensor captures the at least one image.

25. The video capturing device of claim 24 wherein a highest resolution is achieved when all available sensor cells in the region of interest are selectively sampled and wherein a lower resolution is achieved when a subset of the available sensor cells in the region of interest are selectively sampled.

26. The apparatus of claim 23 further comprising a display.

27. The apparatus of claim 19 wherein the sampling function is non-uniform that can be determined and changed dynamically according to the movement of the object or the region of interest relative to the apparatus.

28. The apparatus of claim 19 wherein the object or the region of interest is tracked using one or more face detection techniques.

29. The apparatus of claim 19 wherein the region of interest is updated after a predetermined number of images.

30. The method of claim 1 wherein the sensor is configured so that the highest resolution can occur anywhere in the sensor as the object or the region of interest moves with respect to the capturing device.

31. The apparatus of claim 19 wherein the sensor is configured so that the highest resolution can occur anywhere in the sensor as the object or the region of interest moves with respect to the apparatus.

* * * * *